April 1, 1952 — R. GRAY — 2,590,960
ELECTROLYTE LEVEL INDICATOR AND ANTISPLASH
DEVICE FOR ELECTRIC ACCUMULATORS
Filed Feb. 12, 1947
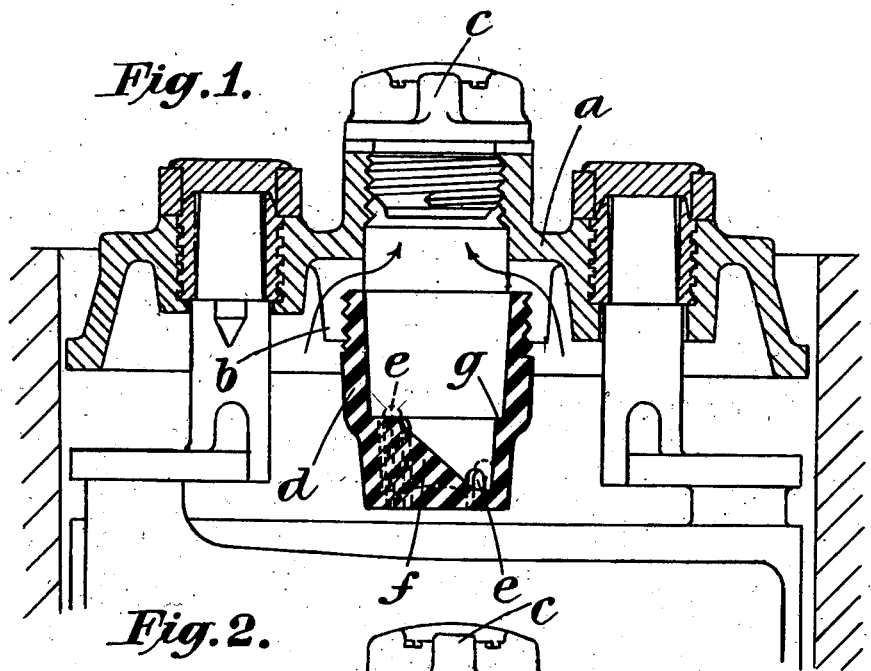
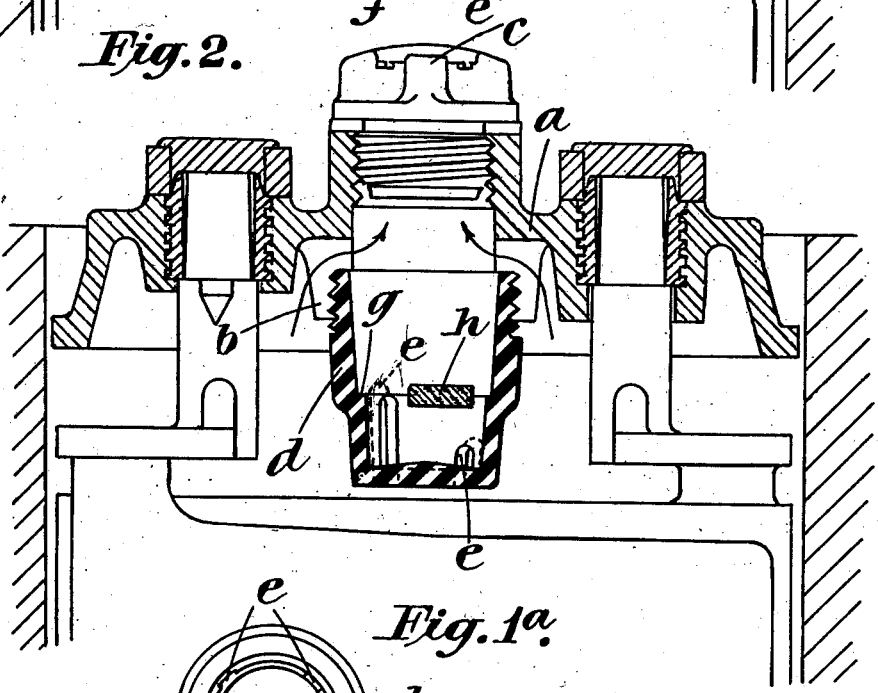
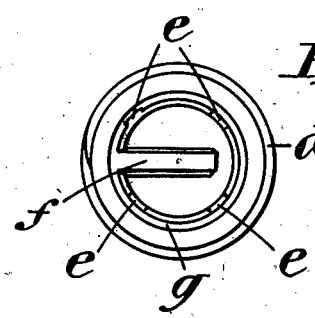
INVENTOR
ROBIN GRAY
BY
Edward J. Dwyer
ATTORNEY Patented Apr. 1, 1952

2,590,960

UNITED STATES PATENT OFFICE 2,590,960

ELECTROLYTE LEVEL INDICATOR AND ANTISPLASH DEVICE FOR ELECTRIC ACCUMULATORS

Robin Gray, Clifton Junction, near Manchester, England, assignor to The Electric Storage Battery Co., a corporation of New Jersey Application February 12, 1947, Serial No. 728,048
In Great Britain September 3, 1945

Section 1, Public Law 690, August 8, 1946
Patent expires September 3, 1965

2 Claims. (Cl. 136—182)

This invention has for its object to provide an improved device for facilitating the examination of the level of electrolyte in an electric accumulator and for minimizing the liability to splashing and spillage of electrolyte under conditions such as experienced with batteries on vehicles.

A device in accordance with this invention comprises a cup-like member, hereinafter referred to as a baffle-cup, which is open at the top and is attached to the dependant slotted or split skirt of an accumulator cell lid and closes the lower parts of the slots while leaving the upper parts open to act as gas passages, and which has in its lower part, which is normally immersed in the electrolyte, at least one hole to provide restricted communication between the liquid in the cup, and that outside it, and means for rendering the electrolyte level in the baffle cup easily recognizable.

In one form of the device according to the invention, in the assembled cell the level of the floor of the baffle cup is arranged to coincide with the minimum electrolyte level, and a visible indication of the normal level is provided in the cup, for example a change in the color of the wall of the cup, or a ridge or shoulder thereon. A float, preferably in the form of a disc may be used to indicate the level of the electrolyte in the cup.

The baffle cup according to the invention largely shields the vent-plug from splashing and surging of the electrolyte, and also serves to safeguard the separators from damage by instruments inserted to measure the specific gravity or temperature of the electrolyte.

Referring to the accompanying explanatory drawings—

Figure 1 is a sectional view of one form of the device according to the invention.

Figure 1A is a plan of the baffle-cup.

Figure 2 is a sectional view of a second form of the device.

Referring to Figure 1, the accumulator lid $a$ has a slotted skirt $b$ around the base of the opening for the vent-plug $c$. The skirt $b$ is threaded internally and a baffle cup $d$ is screwed into it, leaving the upper parts of the slots open for the passage of gas to the vent-plug $c$. The interior of the cup communicates with the interior of the cell through four narrow slots $e$ of varying heights, and in the lower part of the cup a partition $f$ is provided, the upper edge of which is inclined and extends from the floor of the cup to the level of a shoulder $g$ formed in the wall of the cup. The cup is so arranged that its floor coincides with the minimum electrolyte level, and the shoulder $g$ indicates the normal level.

The baffle-cup $d$ may be inspected through the filling aperture in the cell lid when the vent plug is removed, and when the floor of the cup is only just covered by the electrolyte, it is an indication that filling is necessary. The normal level can be recognized by the shoulder $g$ being covered, and intermediate levels are indicated by the amount of the partition $f$ which is covered.

Instead of the slots $e$, small holes may be provided at the floor level and at the level of the shoulder $g$, and, if desired, at intermediate levels. These must allow liquid to enter freely when filling, and should allow continuous mixing of the contents of the cup with the electrolyte in the cell to enable representative samples to be obtained with a normal syringe hydrometer inserted through the filling aperture. At the same time the restricted flow through the holes or slots minimizes the extent to which electrolyte can be splashed against the vent plug when cell is in use.

The interior of the baffle-cup may be of light color, and the part above the normal liquid level may be of a different color from the lower part.

Referring to Figure 2, in this construction the baffle-cup $d$ is similar to that shown in Figure 1, but the partition $f$ is dispensed with, and a float $h$ is placed in the cup, which holds the float located so that it is observable through the filling aperture in the cell lid. The float is made of expanded ebonite or other acid resisting material, and is light enough to float on the electrolyte at all times. It is preferably colored to contrast with the walls of the baffle-cup. It is conveniently formed in the shape of a disc, having a diameter substantially less than the bore of the baffle-cup and of small thickness but of sufficient substance to make it immune from risk of sticking to the walls of the cup. A thickness of $\frac{1}{8}$ to $\frac{3}{16}$ of an inch is found to be suitable.

Such a float is very simple and cheap to provide and by its use the relation between the electrolyte level and the level in the cup is made easily discernible.

What I claim is:

1. In an electric accumulator, the combination of an apertured cover, a slotted skirt dependent from said cover and communicating with said aperture, a baffle cup attached to said skirt partially closing said slots and having at least one opening therein, the floor of said baffle cup coinciding with the minimum electrolyte level, a shoulder internally of said cup corresponding with the normal electrolyte level, and a partition within said cup, the top edge of such partition sloping from the normal electrolyte level to the minimum electrolyte level for indicating level of electrolyte between said shoulder and said floor.

2. In an electric accumulator, the combination of an apertured cover, a slotted skirt dependent from said cover and communicating with said aperture, a baffle cup attached to said skirt and having at least one opening therein, the floor of said baffle cup coinciding with the minimum electrolyte level, shoulder means within said cup coinciding with the normal electrolyte level, and means formed integrally with said cup for indicating the level of the electrolyte within said cup throughout the range between said minimum level and said normal level.

ROBIN GRAY.

REFERENCES CITED

The following references are of record in the file of this patent:

UNITED STATES PATENTS

| Number | Name | Date |
|---|---|---|
| 1,581,104 | Davis | Apr. 20, 1926 |
| 1,699,633 | Sears | Jan. 22, 1929 |
| 1,867,564 | Ford | July 19, 1932 |
| 1,938,989 | Woodbridge | Dec. 12, 1933 |
| 2,053,353 | Talbot | Sept. 8, 1936 |